United States Patent Office 3,319,042
Patented May 9, 1967

3,319,042
APPARATUS FOR GAS-SHIELDED METAL-ARC WELDING
Harry Thostrup and Jostein Fjaertoft, Laxa, Sweden, assignors to Elektriska Svetsningsaktiebolaget, Goteborg, Sweden, a corporation of Sweden
Filed Mar. 9, 1964, Ser. No. 350,320
Claims priority, application Sweden, Mar. 12, 1963, 2,682/63
4 Claims. (Cl. 219—130)

The present invention relates to apparatus for gas-shielded metal arc welding of the type comprising a welding gun provided with a pressure fluid driven wire advancing motor (usually a compressed-air motor) and with a manually actuated pressure fluid valve, the pressure fluid as well as the shielding gas being supplied to the gun through flexible conduits.

In the apparatus of this type hitherto available, the welding gun is provided with a control switch adapted to be operated by the same means as the pressure fluid valve, said control switch being connected through special flexible conductors in a control circuit adapted to control a welding current contactor and/or a solenoid valve controlling the flow of shielding gas to the gun.

It is an object of the invention to provide improved apparatus of the type referred to in which the required control of the supply of shielding gas to the gun is obtained without the provision of any electrical control member in the gun.

The apparatus according to the present invention comprises a welding gun, a pressure fluid drive wire advancing motor in said gun; valve means in said gun for controlling the supply of pressure fluid to said motor; a manually operable actuating member for said valve means; a flexible welding cable; flexible conduits for the supply of shielding gas and pressure fluid to said gun; and a control unit comprising a shielding gas valve adapted to be connected between the flexible shielding gas conduit and a supply of shielding gas, means enclosing a pressure fluid path adapted to be connected between the flexible pressure fluid conduit and a supply of pressure fluid, pressure sensitive means adapted to be operated by a pressure gradient caused by a flow of pressure fluid in said path, and means operated by said pressure sensitive means for operating said shielding gas valve. Preferably the control unit also contains a welding current contactor adapted to be operated by said pressure sensitive means.

In order to provide the pressure gradient required for operating the pressure sensitive means, a constricted passage or a Venturi tube may be included in the pressure fluid path referred to. Compressed-air motors are usually lubricated by passing the air supplied to the motor through an oil-mist lubricator. According to the invention, the pressure sensitive means may be adapted to be operated by the pressure gradient caused by the passage of the air through said lubricator.

To ensure that shielding gas is admitted to the welding gun slightly before the wire advancing motor starts to operate, the valve means provided in the gun may according to the invention be adapted on operation of the actuating member to admit a flow of pressure fluid into a passage by-passing the motor prior to causing pressure fluid to flow to the motor.

The invention will now be described, by way of example, with reference to the accompanying partly diagrammatic drawings, in which:

FIGURE 1 is a diagrammatic plan of a complete welding unit, while

Figure 1:
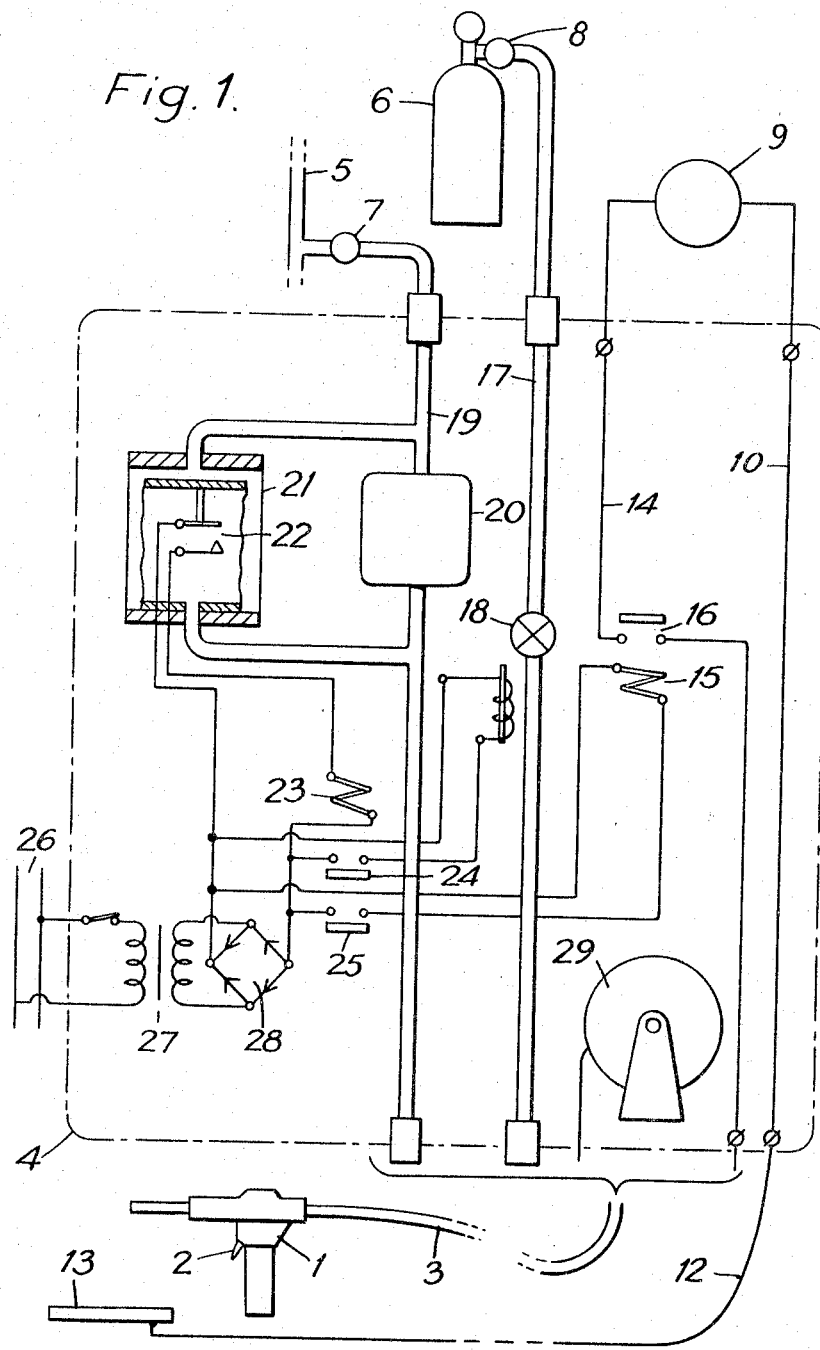

The welding gun 1 of FIG. 1 is provided, as known per se, with a compressed-air driven wire advancing motor and with a valve for controlling the supply of compressed air to said motor, a trigger 2 being provided for actuating said valve. The welding gun is connected to a flexible welding wire guide, a flexible welding current cable and flexible conduits for compressed air and shielding gas, all of which members are enclosed within in a common hose member 3 and connected to a control unit 4. The control unit is connected to a compressed-air distribution system 5 and a shielding gas container 6 through reduction valves 7, 8, respectively. Moreover, the control unit is connected to a source of welding current 9, one terminal of which is connected through the conductor 10 provided in the control unit to the return cable 12 from the workpiece 13, while the other terminal is connected to the welding current cable through a connection 14 containing the contacts 16 of a contactor 15. A shielding gas conduit 17 provided in the control unit for connecting the flexible shielding gas conduit to the container 6 contains a solenoid valve 18. The conduit or path 19 provided in the control unit for connecting the flexible compressed-air conduit to the compressed-air distribution system contains an oil-mist lubricator 20. The pressure gradient caused by the flow of air through said lubricator actuates a differential pressure relay 21 operating a switch 22 connected in series with the D.C. terminals of a full-wave rectifier 28 and the winding of a relay 23. The A.C. terminals of the rectifier are connected to the A.C. network 26 through a transformer 27. The D.C. terminals of the rectifier also feed two more control circuits, to wit, one circuit containing the operating coil of the solenoid valve 18 in series with the normally open contact 24 of the relay 23, and a second circuit containing the winding of contactor 15 in series with the normally open contact 25 of the relay 23. A welding wire drum 29 is rotatably supported in a standard disposed on or near the control unit.

To start the welding operation, the welder pulls the trigger 2, whereby compressed air is admitted to the motor. The flow of air through the lubricator 20 produces a pressure gradient causing the differential pressure relay 21 to close the switch 22. The relay 23 is energized and closes its contacts 24 and 25. The windings of the solenoid valve 18 and the welding current contactor 15 are energized. Solenoid valve 18 opens and admits shielding gas to the welding gun; the contactor closes its contacts 16, so that the welding voltage is admitted to the gun.

Figure 2:
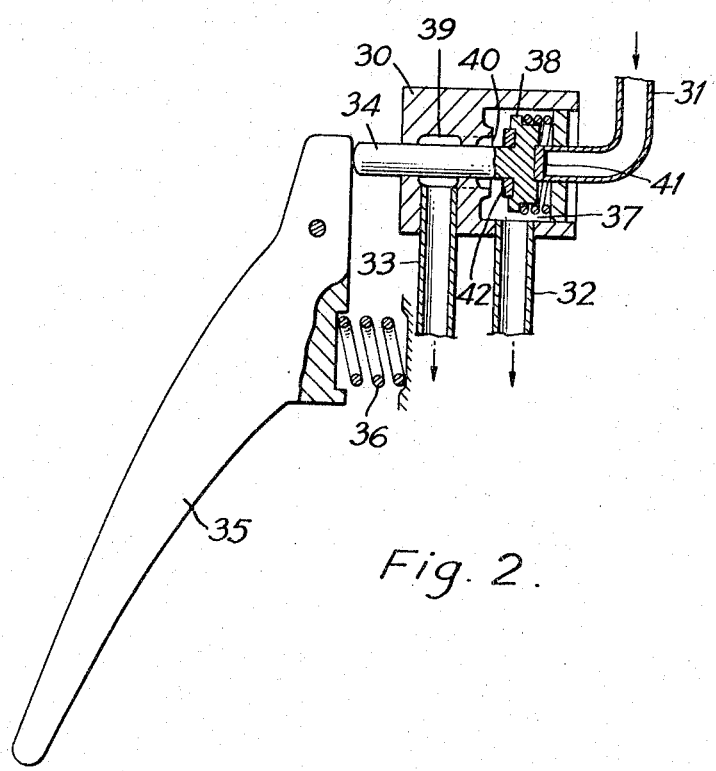
FIGURE 2 is a sectional view of a compressed-air valve suitable for the apparatus according to the invention.

To ensure that the welding arc is adequately shielded in the first moments of its existence, the solenoid valve 18 should be opened slightly in advance of the moment in which the welding wire contacts the workpiece and the welding current begins to flow. FIG. 2 shows a device by which this desirable action is secured. The valve stem 34 and valve body 38 movable in the valve housing 30 are shown in their normal or passive position, in which the member 41 closes the outlet of the air supply conduit 31. A spring 36 acting on the trigger 35 serves to maintain the valve stem in said passive position. The valve chamber 37 is connected not only to the air inlet conduit 32 of the motor, but also through the port 40 and the annular groove 39 to a by-pass conduit 33 connected to the atmosphere. The member 42 on the valve body 38 is adapted to close the port 40 in the extreme left position of the valve body, so that all of the air admitted through the air supply conduit 31 will be forced into the air inlet conduit 32 of the motor. At intermediate positions of the valve body, valve member 41 admits an air current which is sufficient to cause the differential pressure relay 21 (FIG. 1) to operate but which does not cause the motor to start until the pressure difference caused by the passage of the air through the gap between the member 42 and the port 40 has increased to a value sufficient to overcome the initial resistance of the motor. Consequently, a gradual displacement of the valve body 38 from its extreme right to its extreme left position by suitable operation of the trigger will ensure that the shielding gas is admitted to the gun before the arc is started, and that, at the moment in which the the electrode contacts the workpiece, the rate of advancement of the electrode is sufficiently low to prevent starting troubles, such as sticking of the electrode to the work.

We claim:

1. Apparatus for gas-shielded metal arc welding comprising a welding gun, a pressure fluid driven wire advancing motor in said gun, valve means in said gun for controlling the supply of pressure fluid to said motor, a manually operable actuating member connected to said valve means, a flexible welding cable connected to said gun, flexible conduits for the supply of shielding gas and pressure fluid connected to said gun, and a control unit connected to said conduits comprising a shielding gas valve connected between said flexible shielding gas conduit and a supply of shielding gas, a pressure fluid path connected between said flexible pressure fluid conduit and a supply of pressure fluid, pressure sensitive means connected to said path operated by a pressure gradient caused by a flow of pressure fluid in said path and means operated by said pressure sensitive means for opening said shielding gas valve.

2. Apparatus as described in claim 1, said control unit including a welding current contactor operated by said pressure sensitive means.

3. Apparatus as described in claim 1, said motor being a compressed air motor and said pressure fluid path in said control unit including an oil mist lubricator, said pressure sensitive means being actuated by the pressure gradient of the passage of air through said lubricator.

4. Apparatus as described in claim 1, said valve means on actuation of said actuating member first by-passing a flow of pressure fluid around said motor and then directing the flow of pressure fluid to said motor.

References Cited by the Examiner

UNITED STATES PATENTS

| | | | |
|---|---|---|---|
| 2,630,513 | 3/1953 | Redmond | 219—136 |
| 2,862,098 | 11/1958 | Hasselhorn | 219—74 |
| 2,900,488 | 8/1959 | Bassot | 219—130 |
| 3,042,791 | 7/1962 | Reeh | 219—74 X |
| 3,196,249 | 7/1965 | Thostrup | 219—130 |
| 3,253,116 | 5/1966 | Kensrue | 219—130 |

JOSEPH V. TRUHE, *Primary Examiner.*